2,895,917

FLUORESCENT COMPOSITION

Thomas Norman Gaunt, Birkenshaw, near Bradford, England, assignor, by mesne assignments, to Switzer Brothers, Inc., Cleveland, Ohio, a corporation of Ohio No Drawing. Application August 6, 1952
Serial No. 302,989

Claims priority, application Great Britain August 13, 1951

7 Claims. (Cl. 252—301.2)

This invention relates to a method of making a fluorescent composition.

The method according to the present invention comprises the steps of dissolving or dispersing in an aqueous alkaline solution (to which a minor quantity of organic solvent may be added) an alkyd resin or a mixture of alkyd resins capable of dissolving therein and a dyestuff or pigment which has fluorescent properties in the concentration employed, adding a solution which will precipitate the dyed or pigmented resin by the dye or pigment, and separating off the precipitate. The said precipitant preferably has also the property of reacting with excess alkali to give an insoluble dispersion.

The dyestuff or pigment referred to above may of course be a mixture of dyestuffs or pigments; and in such a case one or more of the components of the mixture may have no fluorescent properties, the essential feature being that the mixture as a whole should have fluorescent properties.

As examples of suitable aqueous alkaline solutions there may be mentioned aqueous solutions of ammonia or an alkali metal hydroxide or carbonate; solutions of sodium silicate and borax have also been found to be effective. The solution may (as stated above) contain small quantities of organic solvent.

There may be used for the purpose of the invention a basic dyestuff, e.g. Rhodamine B; an acid dyestuff, e.g. Brilliant Sulphoflavine FF; or a water insoluble dyestuff capable of being finely dispersed in water, e.g. Duranol Brilliant Yellow 6G. Alternatively a finely divided pigment may be used, such as dixanthylene or 2-2¹ dihydroxy naphthaldazine.

The most suitable resin to employ for the purpose of the invention depends to a certain extent upon the dyestuff or pigment. Before discussing this further, we will give two examples of the preparation of suitable resins.

EXAMPLE 1

Glyceryl phthalate 368 gm. (4 mols) glycerol and 888 gm. (6 mols) phthalic anhydride were heated together with mechanical stirring at 170° C. for a total of 4¾ hours. When the acid value had fallen to approx. 160, samples were taken at 15 minute intervals, so as to give a range of samples of acid values between about 160 and 120. After taking the last sample, the residual material had an acid value of 121.2.

EXAMPLE 2

Ethylene phthalate 124 gm. ethylene glycol and 296 gm. phthalic anhydride were heated until a clear solution was obtained and the temperature was maintained at 90° C. for 30 minutes. 296 gm. phthalic anhydride were added and the mixture maintained at 90° C. for 30 minutes. This gave a resin with acid value approx. 330.

One of the best resins for the rhodamines was found to be that sold as Paralac 1201 (an unmodified glycerol-phthalic alkyd resin manufactured by Imperial Chemical Industries, Ltd.), which has an acid value 105–120 and a melting point of about 110° C. Satisfactory results have also been achieved with glyceryl phthalates of acid value 120–140 (prepared in accordance with Example 1 above).

With Brilliant Sulphoflavine FF on the other hand Paralac 1201 gave only moderate results with poor fastness to light. More satisfactory was ethylene phthalate (A.V. approx. 330) (prepared in accordance with Example 2 above). The resin or resins may be modified during or after manufacture by minor quantities of other resins, or fatty acids, etc.

For the purpose of the tests carried out and briefly described in the two preceding paragraphs, a solution of aluminium sulphate was used as the precipitant. The precipitating solution is not however limited to this salt. In experiments carried out with Paralac 1201 other soluble aluminium salts, such as aluminium chloride and aluminium acetate were found to be suitable both in hot and cold solution. Other metallic salts suitable for hot or cold use are the soluble salts of beryllium, zirconium and tin; the soluble salts of zinc, cadmium, barium, strontium and magnesium are suitable for use in the cold.

Various methods of manufacturing fluorescent compositions will be described in the following examples.

EXAMPLE 3

Fluorescent cerise composition 40 gm. finely ground Paralac 1201 is stirred with 320 ccs. cold water and a solution of 6.04 gm. ammonia (S.G. .88) in 54 ccs. cold water is added over 15 mins. After stirring for approx. 30 mins. a clear solution is obtained.

320 ccs. water is added and the solution heated to 90°. Then a solution of 0.3 gm. Rhodamine 6GDN 500% and 0.3 gm. Rhodamine B 500% in 75 ccs. boiling water is added. The temperature of the solution is quickly brought to 98–100° C. and a solution of 12.8 gm. aluminum sulphate in 128 ccs. water at 100° C. is added over 3 minutes. Cold water is then added to reduce the temperature of the suspension to below 60° C. and the composition is filtered off and washed with cold water. The composition is dried at 50° C. and a yield of 37 gm. is obtained.

EXAMPLE 4

Fluorescent cerise composition 40 gm. finely ground Paralac 1201 is stirred with 320 ccs. cold water and a solution of 6.04 gm. ammonia (S.G. 0.88) in 54 ccs. cold water is added over 15 mins. After stirring for approx. 30 mins. a clear solution is obtained.

The solution is heated to 55° C. and a solution of 0.57 gm. Rhodamine 6GDN 500% and 0.57 gm. Rhodamine B 500% in 120 ccs. boiling water is added. The solution is heated to 60° C. and a solution of 12.8 gm. aluminium sulphate in 128 ccs. water at 60° C. is added over 3 minutes. The precipitate is filtered off and washed with cold water. Yield 37 gm. dry weight.

EXAMPLE 5

Fluorescent scarlet composition 40 gm. Paralac 1201 is dissolved as in above Examples 3 and 4.

320 ccs. water is added and the temperature of the solution raised to 90° C. A solution of 0.24 gm. Rhodamine B 500% and 0.72 gm. Rhodamine 6GDN 500% in 120 ccs. water at 100° C. is added, followed by a solution of 1.44 gm. Brilliant Sulphoflavine FF in 50 ccs.

water at 100° C. The solution is then quickly heated to 98–100° C. and 128 ccs. of 10% aluminium sulphate solution at 100° C. added over 3 minutes. The colour now has a fairly heavy yellow water bleed and this can be greatly reduced by adding 40 ccs. of a 10% Fixanol C solution. Cold water is added to reduce the temperature to below 60° C. and the colour filtered off. It is washed with cold water and dried at 50° C. Yield 37 gm.

EXAMPLE 6

A composition similar to that obtained in Example 4 above may be obtained by repeating the method of Example 4 but replacing the 12.8 gm. aluminium sulphate by 7.5 gm. beryllium sulphate.

EXAMPLE 7

*Fluorescent yellow composition*

25 gm. ethylene phthalate, as prepared according to Example 2, are suspended in 200 ccs. cold water and a solution of 11.2 gm. ammonia (S.G. 0.88) in 100 ccs. cold water is added over 15 minutes. This is stirred until a clear solution is obtained.

A solution of 1.25 gm. Brilliant Sulphoflavine FF in 60 ccs. boiling water is added and the solution heated to 98–100° C. The colour is precipitated by adding a boiling solution of 24 gm. aluminium sulphate in 240 ccs. water over 3 minutes. To reduce the yellow water bleed, 25 ccs. 10% Fixanol C solution is added. The colour is filtered off, washed with cold water and dried at 50° C. Yield 24 gm.

EXAMPLE 8

Example 7 may be repeated using 2.5 gm. Brilliant Sulphoflavine FF in 100 ccs. water. A brilliant yellow fluorescent composition is obtained.

EXAMPLE 9

Example 7 may be repeated with both the resin solution and aluminium sulphate solution at 15–20° C. and finally drying the colour at 90–95° C. This reduces the yellow water bleed before filtration and yields a product very similar to that obtained in Example 7.

EXAMPLE 10

Example 7 may be repeated replacing the Brilliant Sulphoflavine FF by 0.75 gm. Azosol Yellow 6GF. The Azosol Yellow 6GF, dissolved in 25 ccs. methyl glycol, is added to the resin solution at 98–100° C. just before laking. The addition of Fixanol C is not made.

EXAMPLE 11

Example 7 may be repeated replacing the Brilliant Sulphoflavine FF by 0.75 gm. Setoflavine T 190%. There is not water bleed and the addition of Fixanol C is not made.

EXAMPLE 12

Orange and Greens may be made by the method in Example 7 using the following weights of dye:

| | Orange, gm. | Orange, gm. | Light Green, gm. | Light Green, gm. | Mid Green, gm. | Mid Green, gm. |
|---|---|---|---|---|---|---|
| Brilliant Sulphoflavine FF | 1.25 | 2.5 | 2.0 | 2.5 | 2.0 | 2.5 |
| Rhodamine 6GDN 500% | 0.1875 | .375 | | | | |
| Monosol Fast Blue 2GS | | | 0.25 | 0.3125 | 0.4 | 0.5 |

If it is desired to use the fluorescent compositions described above for coating paper, the precipitate after filtering is not dried off; instead, the filter cake is dispersed in the following medium:

100 gm. Paralac 1201
50 gm. methyl glycol
20 cc. ammonia

Binding media or vehicles for the above compositions may contain colouring matter which may be the same as or different to that contained in the particles of the composition. This may be advantageous when thin films are used.

The fluorescent compositions made in accordance with this invention may be used in inks for security documents.

The compositions may be readily compounded into inks to be printed by any known process, for instance a letterpress ink is made by dispersing 10 gm. of the composition, made as described in Example 4, in a varnish consisting of 13 gm. Paralac 21, 15 gm. dibutyl phthalate, and .5 cc. triethanolamine; and paper printed with this ink exhibits brightly coloured cerise of outstanding fluorescence. A silkscreen ink is readily made by dispersing 12 gm. of the composition made as described in Example 3, in a varnish comprising 30 gm. Paralac 385 (an alcohol modified alkyd resin free from resin oils or phenolics having a melting point of 69–79° C., an acid value of 30–50 and a specific gravity of 1.28) and 25 ccs. methyl glycol. This ink again yields a very brightly fluorescent cerise when printed upon paper. The composition may be readily incorporated into chalks, crayons, concrete, artificial stones, paper pulp, and spinning solutions for the manufacture of certain artificial fibres. They may be applied when incorporated in suitable binding media to wood, metal, paper, cloth, plastic, porcelain or linoleum. They may also be used in making electrical lamps, signs and instruments. Their permanence and brightness is to some extent dependent upon the medium in which they are incorporated, and in general optimum properties have been obtained by using a dispersing medium comprising an alkyd or modified alkyd resin, a simple or modified urea formaldehyde or melamine formaldehyde resin, a resin derived from acrylic acid or its esters or other simple derivatives, or a mixture of any such resins.

What I claim and desire to secure by Letters Patent is:

1. A fluorescent pigment consisting essentially of a precipitate of a metallic salt of an alkyd resin, uniformly colored with a fluorescent dye, said metal component being selected from the group consisting of aluminum, zinc, magnesium and the alkaline earth metals.

2. A fluorescent-dyed alkyd resin composition essentially composed of a composite precipitate of a metallic salt of an alkyd resin and a fluorescent dyestuff, said metal component being a metal selected from the group consisting of aluminum, beryllium, zirconium, tin, zinc, barium, strontium, and magnesium, the concentration of the fluorescent dyestuff therein being such that the composition exhibits fluorescence.

3. A dispersion of the composition defined by claim 2 in a medium containing at least one resin selected from the group consisting of an alkyd resin, a urea-formaldehyde resin, a melamine-formaldehyde resin and an acrylic acid resin.

4. A method of making a fluorescent-dyed alkyd resin composition which comprises dissolving at least one alkaline-soluble alkyd resin in an aqueous alkaline solution, introducing a fluorescent dyestuff into such solution, adding to said solution a solution of a soluble salt of a metal selected from the group consisting of aluminum, beryllium, zirconium, tin, zinc, barium, strontium, and magnesium and recovering the fluorescent-dyed resin composition precipitated by said salt solution, the concentration of the fluorescent dyestuff therein being such that the composition exhibits fluorescence.

5. A method according to claim 4 in which a minor amount of an organic solvent is added to the solution of the alkyd resin and dyestuff in the aqueous alkaline solution prior to the addition of the solution of the soluble metal salt.

6. A method according to claim 4 in which the metallic salt is an aluminum salt.

7. A method according to claim 4 in which the solution of the metal salt is added gradually to the solution of the alkyd resin and dyestuff in the aqueous alkaline solution.

References Cited in the file of this patent

UNITED STATES PATENTS

| | | |
|---|---|---|
| 1,780,375 | Bradley | Nov. 4, 1930 |
| 1,974,510 | Reindel | Sept. 25, 1934 |
| 2,013,099 | Headley | Sept. 3, 1935 |
| 2,045,080 | Hagedorn | June 23, 1936 |
| 2,113,090 | McKeag | Apr. 5, 1938 |
| 2,202,283 | Cassel | May 28, 1940 |
| 2,455,898 | Ness | Dec. 7, 1948 |
| 2,498,592 | Switzer | Feb. 21, 1950 |